United States Patent [19]

Kim et al.

[11] Patent Number: 5,408,262
[45] Date of Patent: Apr. 18, 1995

[54] COCHANNEL INTERFERENCE FILTER FOR HDTV TRANSMISSION SYSTEM

[75] Inventors: Kyeong S. Kim; Moon K. Lee, both of Wheeling, Ill.

[73] Assignee: Goldstar Co., Ltd., Seoul, Rep. of Korea

[21] Appl. No.: 176,272

[22] Filed: Dec. 30, 1993

[51] Int. Cl.6 .............................................. H04N 5/38
[52] U.S. Cl. ...................................... 348/21; 348/608; 348/723; 375/350
[58] Field of Search ............... 348/607, 608, 720, 628, 348/21, 723; 375/18, 103; H04N 5/217, 5/38

[56] References Cited

U.S. PATENT DOCUMENTS

| | | | |
|---|---|---|---|
| 4,367,495 | 1/1983 | Mita et al. | 375/18 |
| 5,087,975 | 2/1992 | Citta et al. | 375/103 |
| 5,121,203 | 6/1992 | Citta | 358/141 |
| 5,132,797 | 7/1992 | Citta | 358/167 |
| 5,144,431 | 9/1992 | Citta | 358/141 |
| 5,258,838 | 11/1993 | Citta | 348/470 |
| 5,270,816 | 12/1993 | Citta et al. | 348/470 |
| 5,289,283 | 2/1994 | Hopper et al. | 348/607 |

*Primary Examiner*—James J. Goody
*Assistant Examiner*—Jeffrey S. Murrell

*Attorney, Agent, or Firm*—Finnegan, Henderson, Farabow, Garrett & Dunner

[57] ABSTRACT

A cochannel interference filter for a HDTV transmission system comprising a post-comb filter. The post-comb filter comprises first and second feedforward circuits. The first feedforward circuit includes a first adder and a first delay circuit. The first adder has a first input connected to an output of a data clock recovery circuit. The first delay circuit has an input connected to the output of the data clock recovery circuit and an output connected to a second input of the first adder. The second feedforward circuit includes a second adder and a second delay circuit. The second adder has a first input connected to an output of the first adder. The second delay circuit has an input connected to the output of the first adder and an output connected to a second input of the second adder. Also, the post-comb filter comprises third and fourth feedforward circuits. The third feedforward circuit includes a third adder and a third delay circuit. The third adder has a first input connected to an output of the second adder. The third delay circuit has an input connected to the output of the second adder and an output connected to a second input of the third adder. Similarly, the fourth feedforward circuit includes a fourth adder and a fourth delay circuit.

15 Claims, 11 Drawing Sheets

COCHANNEL INTERFERENCE FILTER FOR HDTV TRANSMISSION SYSTEM

BACKGROUND OF THE INVENTION

The present invention relates in general to high definition television (referred to hereinafter as HDTV) transmission systems, and more particularly to a cochannel interference filter for a HDTV transmission system.

In the case where a NTSC transmitter transmits a NTSC-coded signal at the same time that a HDTV transmitter transmits a HDTV-coded signal through a television channel of 6 MHZ, a HDTV receiver receives an undesirable strong interference component from the NTSC transmitter as well as the HDTV-coded signal from the HDTV transmitter, because of various factors including its physical position. The transmission of the desired HDTV signal with the undesirable signal through the same channel is usually called cochannel interference. Many HDTV transmission systems have been developed to remove cochannel interference, and one example is shown in FIG. 1.

Figure 1:
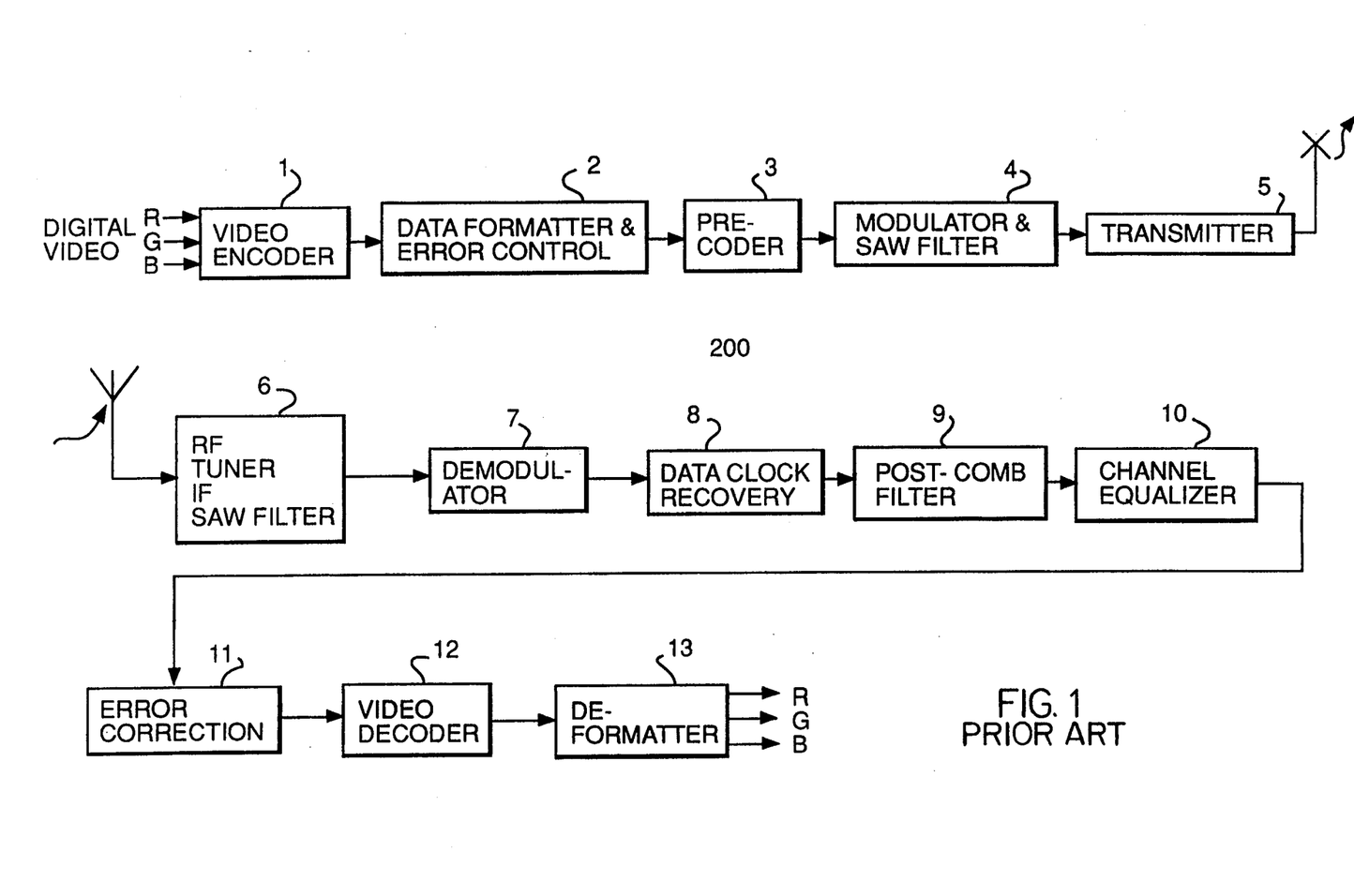
FIG. 1 is a block diagram of a conventional HDTV transmission system.

Referring to FIG. 1, there is shown a block diagram of a conventional HDTV transmission system. As shown in this drawing, the conventional HDTV transmission system comprises a HDTV transmitter 100 and a HDTV receiver 200. The HDTV transmitter 100 comprises a video encoder 1 for band-compressing a video signal of 37 MHZ into a frequency band signal of 6 MHZ. The video signal contains red (R), green (G) and blue (B) color signals.

A data formatter/error control circuit 2 is provided in the HDTV transmitter 100 to receive the output signal from the video encoder 1, as well as an audio signal and auxiliary data, format the received signals and data in the NTSC format and perform a Reed-Solomon (R-S) coding for error correction of the received signals and data.

A pre-coder 3 is also provided in the HDTV transmitter 100 to code an output signal from the data formatter/error control circuit 2 in such a manner that 525 line data will be transmitted 60 times per second. The pre-coder 3 also acts to compensate for a characteristic of a post-comb filter 9, as will be described later in detail.

Also, the HDTV transmitter 100 comprises a modulator/SAW filter circuit 4 for VSB-modulating an output signal from the pre-coder 3, and a transmitter 5 for converting an output signal from the modulator/SAW filter circuit 4 into a radio frequency (RF) signal and transmitting the converted RF signal through a transmitting antenna.

The HDTV receiver 200 comprises a RF tuner/IF SAW filter circuit 6 for selecting a desired one of the RF signals received through a receiving antenna and converting the selected RF signal into an intermediate frequency (IF) signal with a band width of 6 MHZ, a demodulator 7 for demodulating the IF signal from the RF tuner/IF-SAW filter circuit 6 into a base band signal of 6 MHZ, and a data clock recovery circuit 8 for detecting a data clock and vertical and horizontal synchronous signals from the base band signal from the demodulator 7.

The post-comb filter 9 is provided in the HDTV receiver 200 to remove a NTSC cochannel interference component from an output signal from the data clock recovery circuit 8.

A channel equalizer 10 is also provided in the HDTV receiver 200 to compensate for a linear channel distortion such as a tilt, a ghost, an inter-symbol interference and etc.

An error correction circuit 11 is also provided in the HDTV receiver 200 to perform R-S decoding for error correction of an output signal from the channel equalizer 10.

Also, the HDTV receiver 200 comprises a deformatter 12 for separating a video signal, an audio signal and auxiliary data from an output signal from the error correction circuit 11, and a video decoder 13 for expanding the video signal of 6 MHz from the deformatter 12 into a frequency band signal of 37 MHZ.

Figure 2A:
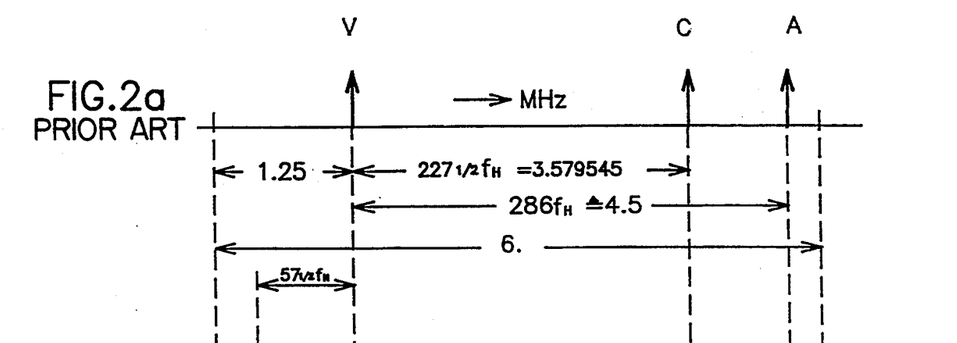
FIGS. 2a to 2c are frequency spectra used to remove a NTSC cochannel interference component in accordance with the prior art.
Figure 2B:
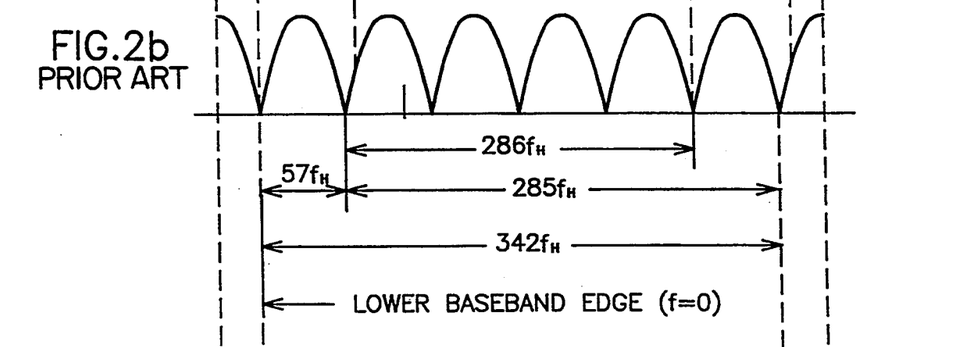
Figure 2C:
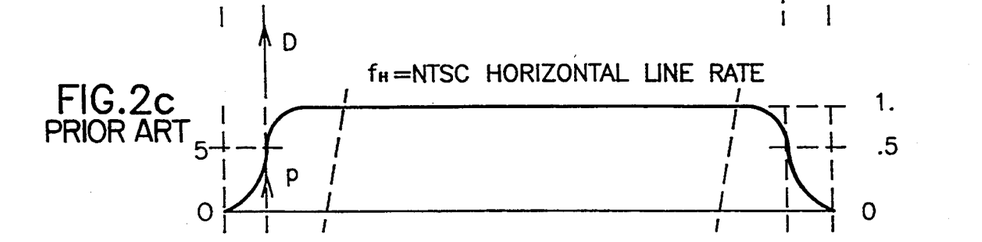

FIGS. 2a to 2c are frequency spectra used to remove the NTSC cochannel interference component in accordance with the prior art. FIG. 2A is a frequency spectrum of a video carrier, a chrominance subcarrier and an audio carrier of a NTSC signal, FIG. 2b is a frequency spectrum illustrating the characteristic of the post-comb filter 9 in FIG. 1 and FIG. 2c is a frequency spectrum of a typical HDTV signal. In FIG. 2A, the video carrier V is 1.25 MHZ apart from one side of the channel, the chrominance subcarrier C is about 3.87 MHZ apart from the video carrier V and the audio carrier A is about 4.5 MHZ apart from the video carrier V.

A pilot signal of the HDTV signal is $57\frac{1}{2}$ $f_H$ apart from the video carrier and the NTSC carriers or the video carrier, the chrominance subcarrier and the audio carrier are present nearly in null points. In this connection, the NTSC carriers can be removed by the post-comb filter 9, so that a S/N ratio of the HDTV receiver can be enhanced. Here, $f_H$ is a NTSC horizontal line rate.

Figure 3A:
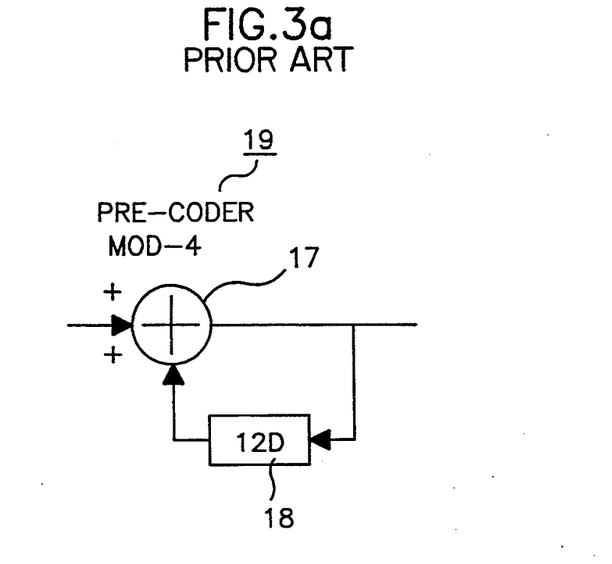
FIG. 3a is a block diagram of a pre-coder in FIG. 1.
Figure 3B:
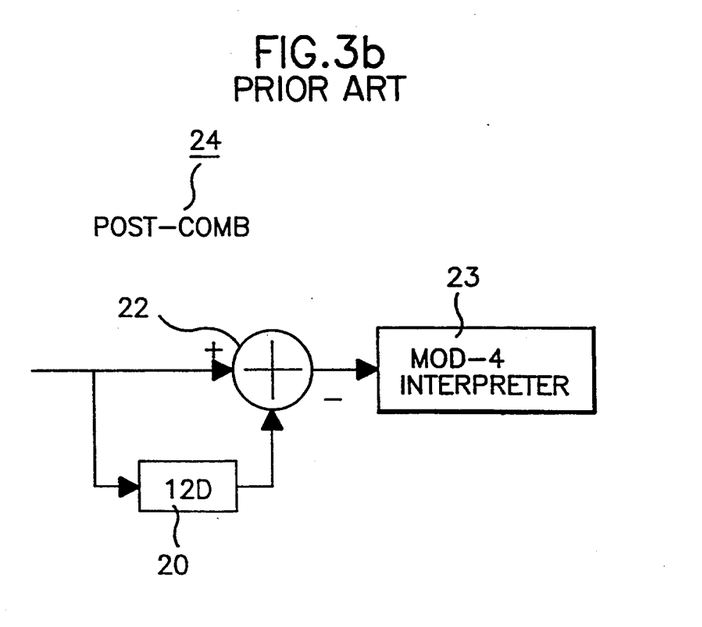
FIG. 3b is a block diagram of a post-comb filter in FIG. 1.

FIG. 3a is a block diagram of the pre-coder 3 in FIG. 1 and FIG. 3b is a block diagram of the post-comb filter 9 in FIG. 1 with the characteristic as shown in FIG. 2b. As shown in FIG. 3a, the pre-coder 3 includes a feedback circuit provided with a modulo-4 adder 17 and a delay circuit 18. The modulo-4 adder 17 receives the output signal from the data formatter/error control circuit 2 at its first input and receives back its output signal delayed through the delay circuit 18 as its second input.

As shown in FIG. 3b, the post-comb filter 9 includes a feedforward circuit provided with a delay circuit 20 and an adder 22. The output signal from the data clock recovery circuit 8 is applied to the delay circuit 20. The output signal from the data clock recovery circuit 8 is also applied as a first input of the adder 22, which receives an output signal from the delay circuit 20 as its second input. The adder 22 acts to subtract the output signal from the delay circuit 20 from the output signal from the data clock recovery circuit 8. An output signal from the adder 22 is applied to a modulo-4 interpreter 23, which is provided between the post-comb filter 9 and the channel equalizer 10.

The delay circuits 18 and 20 have the same delay characteristic. Because the pre-coder 3 performs a pure digital operation, the delay characteristic of the delay circuit 18 must be an integer multiple of a data sampling rate fs, namely, $D=N(1/fs)$.

In the case of DSC-HDTV, 2 level data or 4 level data may be used as the input to the feedback circuit of the pre-coder 3. If the 4 level data is passed through the feedback circuit, 7 level data can be obtained at the output. This results in an increase in the power of the HDTV transmitter. For this reason, the modulo-4 adder 17 is used instead of a general adder in the pre-coder 3. With the modulo-4 adder 17 used, the input 4 level data is directly outputted.

On the other hand, the post-comb filter 9 inputs 4 level data and outputs 7 level data. The 7 level data from the post-comb filter 9 is outputted as 4 level data by the modulo-4 interpreter 23.

However, the above-mentioned conventional HDTV transmission system has a disadvantage in that it cannot remove harmonic components of the video carrier, the chrominance subcarrier and the audio carrier of the NTSC signal since it is designed to remove only the video carrier, the chrominance subcarrier and the audio carrier of the NTSC signal. Also, the video carrier, the chrominance subcarrier and the audio carrier of the NTSC signal cannot completely be removed because they, are not completely positioned in the null points.

SUMMARY OF THE INVENTION

Therefore, the present invention has been made in view of the above problems, and it is an object of the present invention to provide a cochannel interference filter for a HDTV transmission system which is capable of completely removing NTSC carriers and harmonic components thereof.

In accordance with the present invention, the above and other objects can be accomplished by a provision of a cochannel interference filter for a HDTV transmission system having a transmitter and a receiver, comprising filtering means provided in said receiver, said filtering means including null points at a frequency with the following response characteristic:

$kfh/(2 \times 525)$ where, k is an even number except 0 and fh is a NTSC horizontal line rate; and compensation means provided in said transmitter for compensating for transmission signal components removed by said filtering means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 4A:
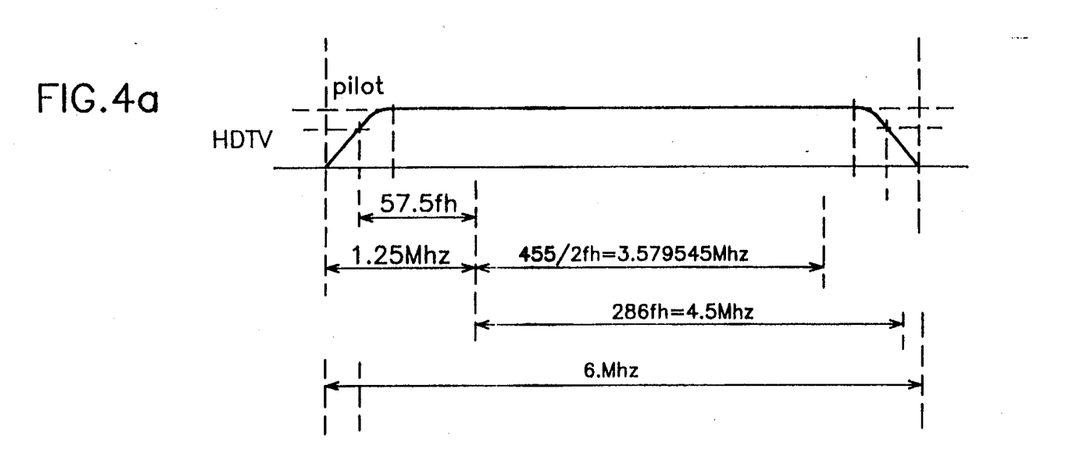
FIGS. 4a to 4o are frequency spectra used to remove the NTSC cochannel interference component in accordance with the present invention.
Figures 4B, 4C:
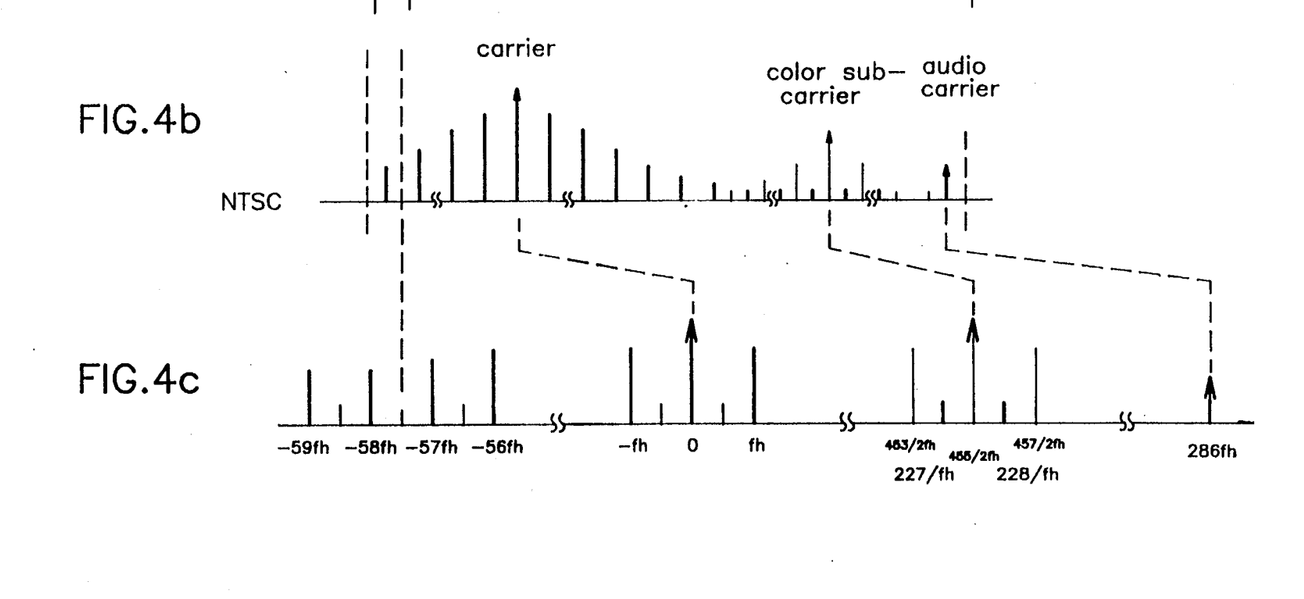
Figure 4D:
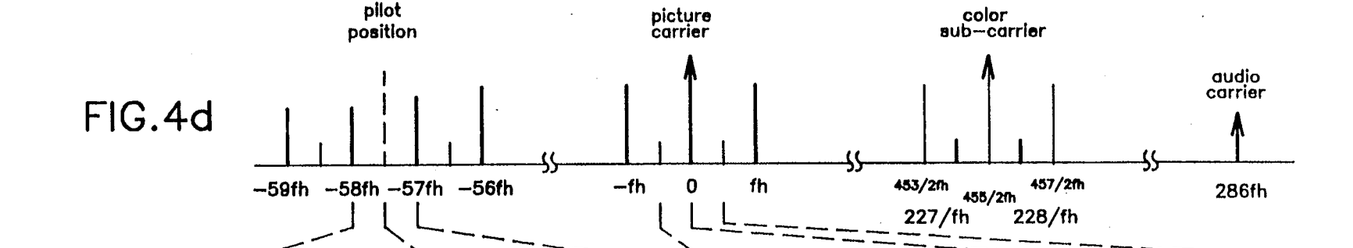

FIGS. 4a to 4d are frequency spectra used to remove a NTSC cochannel interference component in accordance with the present invention. FIG. 4a is a frequency spectrum of a HDTV signal, FIG. 4b is a frequency spectrum of a NTSC signal and FIG. 4c is a frequency spectrum of a video carrier of the NTSC signal and harmonic components thereof, in which an interval between the adjacent harmonic components is fh which is a NTSC horizontal line rate.

An interval between a pilot signal of the HDTV signal and the video carrier of the NTSC signal is 57.5 fh and an interval between the video carrier and a chrominance subcarrier of the NTSC signal is 455/2 fh. Also, an interval between the video carrier and an audio carrier of the NTSC signal is 286 fh.

Figure 4E:
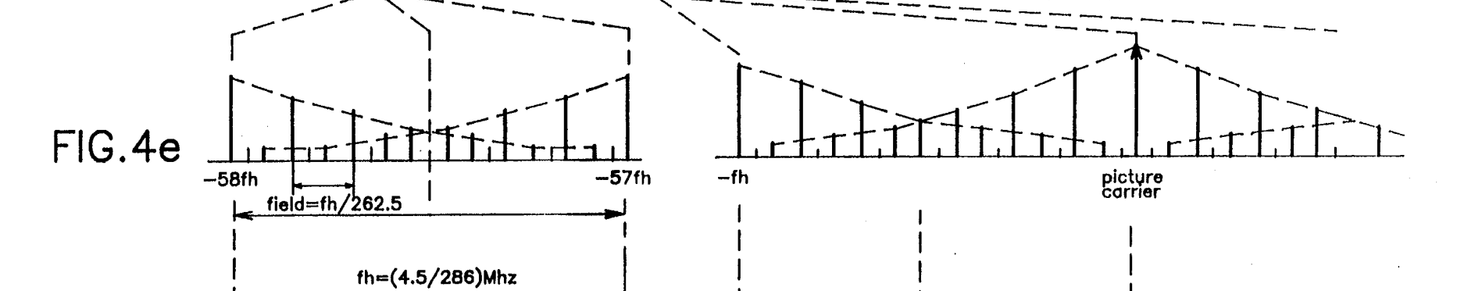

FIG. 4e is a detailed frequency spectrum of the pilot signal of the HDTV signal and the video carrier of the NTSC signal. As seen from this drawing, 262.5 signal components are present at an interval between −57 fh and −58 fh, namely, 1 fh.

Figure 4F:
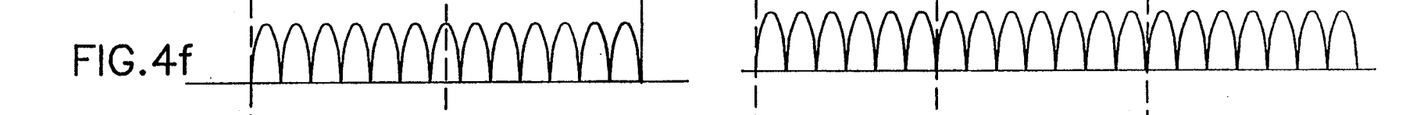
Figure 4G:
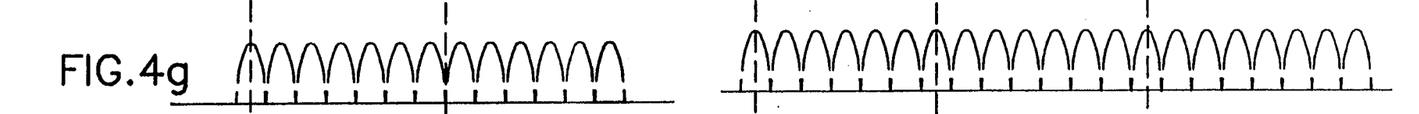

FIGS. 4f and 4g are frequency spectra illustrating filtering characteristics. In FIG. 4f, signal components shown by solid lines in FIG. 4e are positioned in null points. In FIG. 4g, signal components shown by dotted lines in FIG. 4e are positioned in the null points.

Figure 4H:
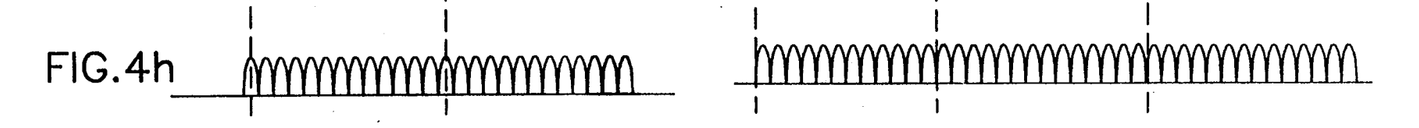
Figure 4I:
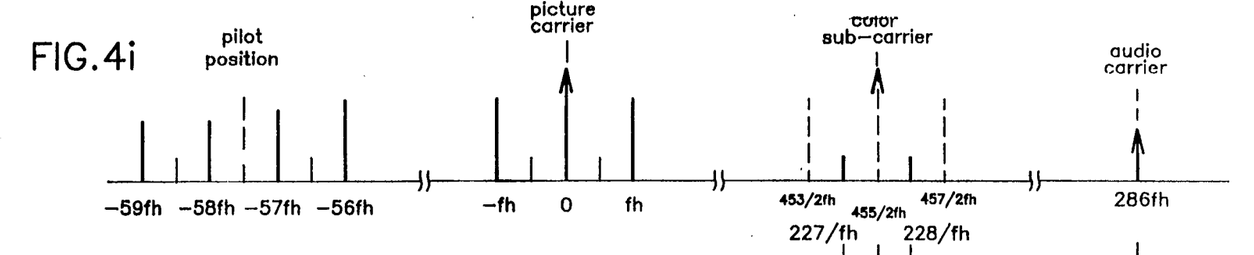

FIG. 4h is a frequency spectrum illustrating a filtering characteristic which is obtained by mixing the filtering characteristics of FIGS. 4f and 4g. In this drawing, all the signal components shown by the solid and dotted lines in FIG. 4e are positioned in the null points.

Figure 4J:
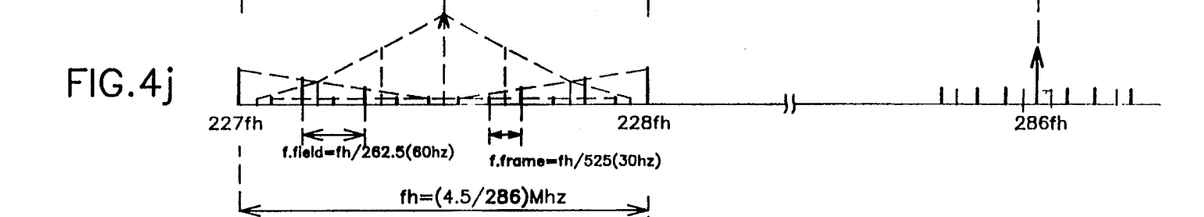

FIG. 4j is a detailed frequency spectrum of the chrominance subcarrier and the audio carrier of the NTSC signal. Similarly, in this drawing, 262.5 signal components are present at an interval 1 fh.

Figure 4K:
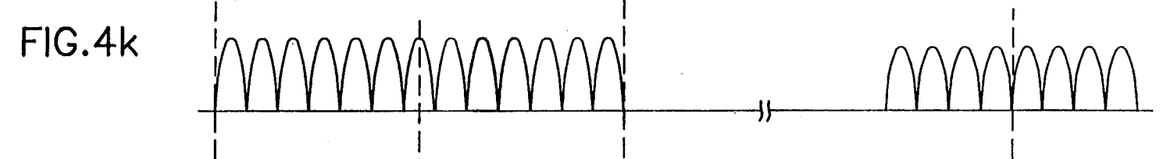
Figure 4L:
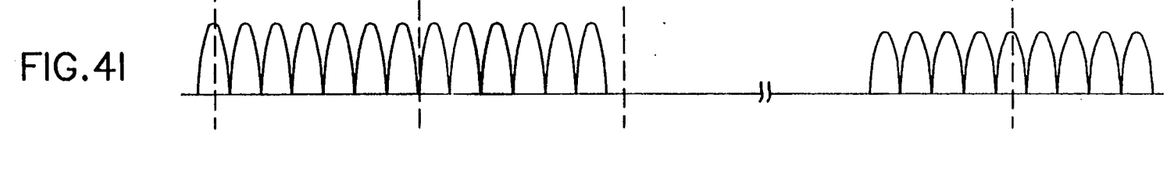

FIGS. 4k and 4l are frequency spectra illustrating filtering characteristics. In FIG. 4k, signal components shown by solid lines in FIG. 4J are positioned in the null points. In FIG. 4l, signal components shown by dotted lines in FIG. 4j are positioned in the null points.

Figure 4M:
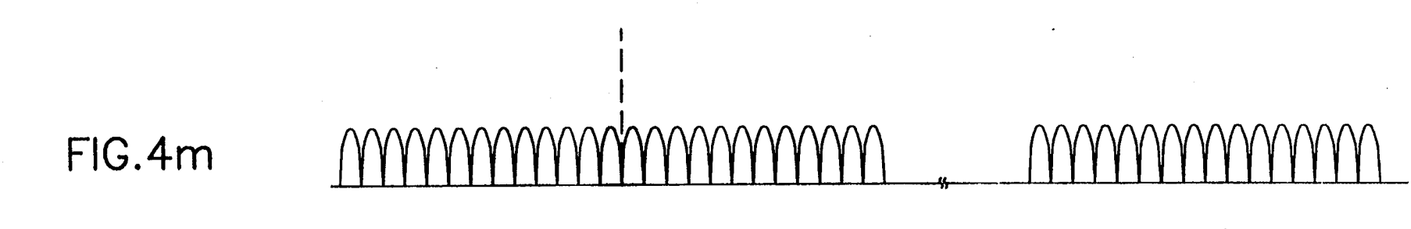

FIG. 4m is a frequency spectrum illustrating a filtering characteristic which is obtained by mixing the filtering characteristics of FIGS. 4k and 4l. In this drawing, all the signal components shown by the solid and dotted lines in FIG. 4j are positioned in the null points.

As a result, the video and audio carriers and the harmonic components thereof of the NTSC signal are removed by the filtering characteristics as shown in FIGS. 4f and 4k and the chrominance subcarrier and the harmonic components thereof of the NTSC signal are removed by the filtering characteristics as shown in FIGS. 4g and 4l. In other words, the video carrier, the chrominance subcarrier and the audio carrier and the harmonic components thereof of the NTSC signal are removed by the composite filtering characteristic as shown in FIG. 4h, in which the filtering characteristics of FIGS. 4f and 4g are mixed, and by the composite filtering characteristic as shown in FIG. 4m, in which the filtering characteristics of FIGS. 4k and 4l are mixed.

Therefore, the NTSC cochannel interference component can completely be removed by a HDTV receiver of a HDTV transmission system in accordance with the present invention.

Figure 5A:
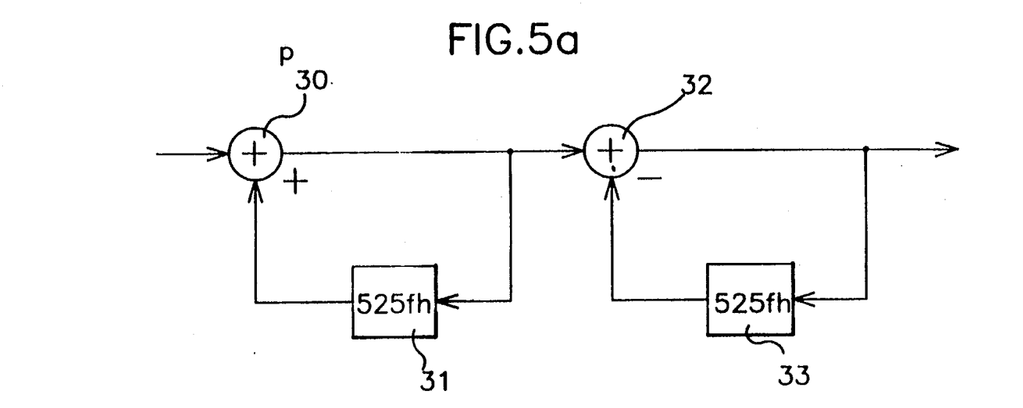
FIG. 5a is a block diagram of a pre-coder in accordance with an embodiment of the present invention.
Figure 5B:
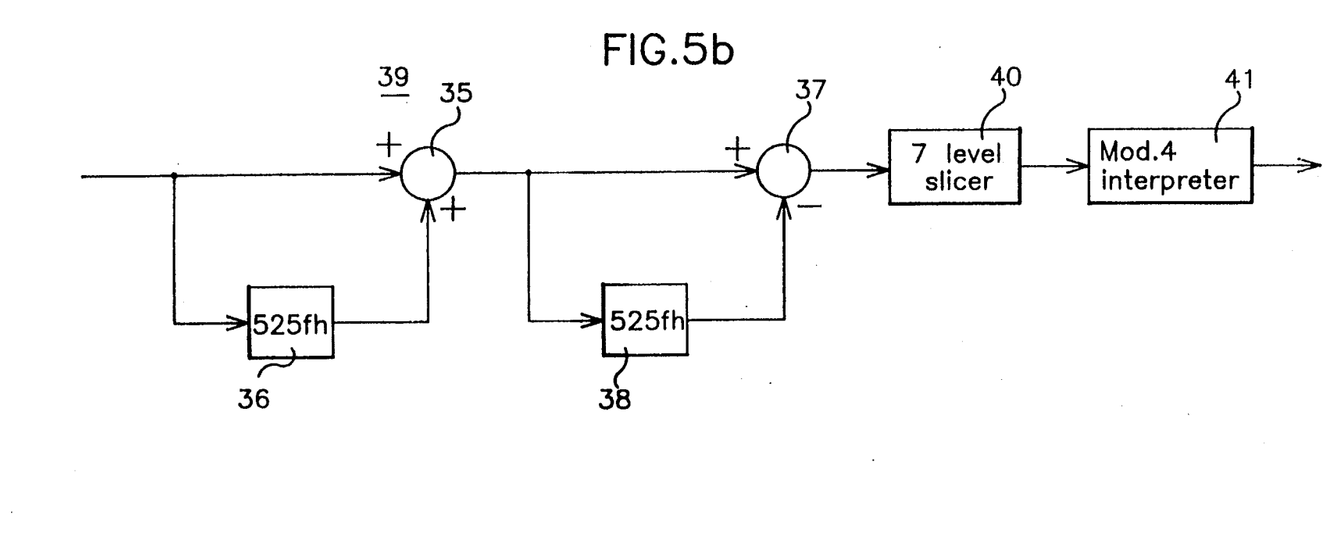
FIG. 5b is a block diagram of a post-comb filter in accordance with the embodiment of the present invention.
Figure 5C:
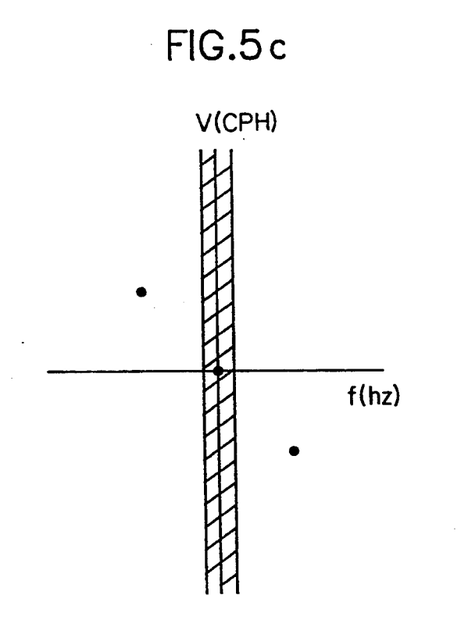
FIG. 5c is a view illustrating a third-dimensional filtering characteristic of a first feedforward circuit in the post-comb filter in FIG. 5b.
Figure 5D:
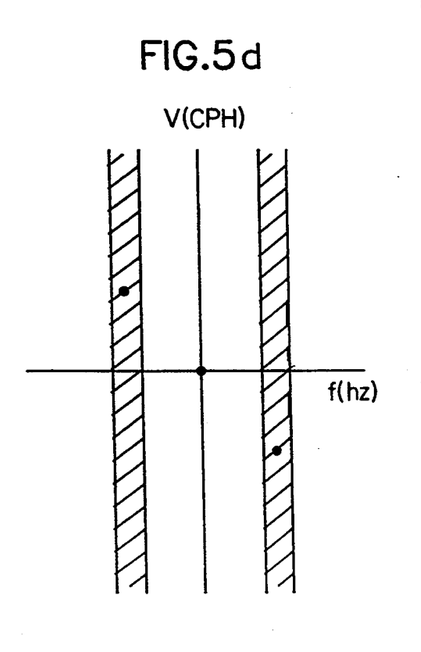
FIG. 5d is a view illustrating a third-dimensional filtering characteristic of a second feedforward circuit in the post-comb filter in FIG. 5b.
Figure 5E:
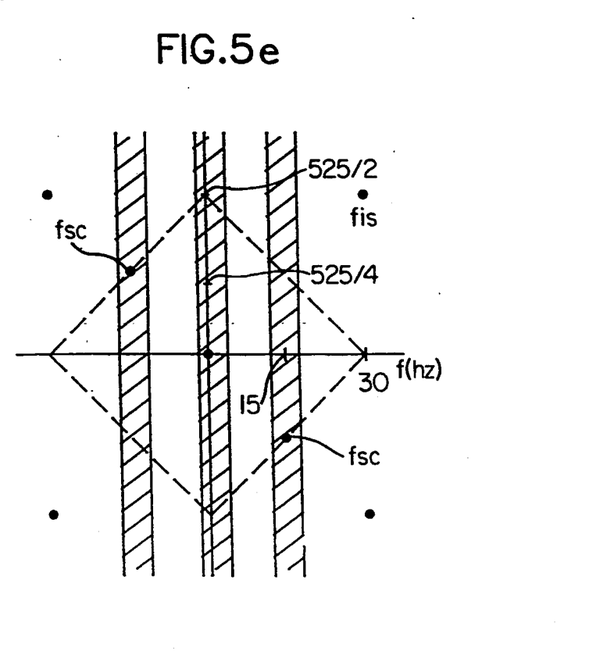
FIG. 5e is a view illustrating a composite third-dimensional filtering characteristic of the post-comb filter in FIG. 5b.

FIG. 5a is a block diagram of a pre-coder 34 in accordance with an embodiment of the present invention, FIG. 5b is a block diagram of a post-comb filter 39 in accordance with the embodiment of the present invention, FIG. 5c is a view illustrating a third-dimensional filtering characteristic of a first feedforward circuit in the post-comb filter 39 in FIG. 5b, FIG. 5b is a view illustrating a third-dimensional filtering characteristic of a second feedforward circuit in the post-comb filter in FIG. 5b and FIG. 5e is a view illustrating a composite third-dimensional filtering characteristic of the post-comb filter 39 in FIG. 5b.

In FIG. 5b, the post-comb filter 39 comprises first and second feedforward circuits. The first feedforward circuit includes a first adder 35 and a first delay circuit 36. The first adder 35 has a first input connected to the output of the data clock recovery circuit 8 shown in FIG. 1. The first delay circuit 36 has an input connected to the output of the data clock recovery circuit 8 and an output connected to a second input of the first adder 35.

The second feedforward circuit includes a second adder 37 and a second delay circuit 38. The second adder 37 has a first input connected to an output of the first adder 35 in the first feedforward circuit. The second delay circuit 38 has an input connected to the output of the first adder 35 in the first feedforward circuit and an output connected to a second input of the second adder 37.

A filtering characteristic of the first delay circuit 36 and the first adder 35 in the first feedforward circuit is the same as those shown in FIGS. 4f and 4k in view of a frequency domain. Also, in view of a three-dimensional domain, the filtering characteristic of the first delay circuit 36 and the first adder 35 in the first feedforward circuit is the same as that shown in FIG. 5c. In FIG. 5c, the harmonic components of the video carrier are removed in the three-dimensional domain.

A filtering characteristic of the second delay circuit 38 and the second adder 37 in the second feedforward circuit is the same as those shown in FIGS. 4g and 4l in view of the frequency domain. Also, in view of the three-dimensional domain, the filtering characteristic of the second delay circuit 38 and the second adder 37 in the second feedforward circuit is the same as that shown in FIG. 5d. In FIG. 5d, the chrominance subcarrier fsc is removed in the three-dimensional domain.

As a result, a composite filtering characteristic of the post-comb filter 39 with the first and second delay circuits 36 and 38 and the first and second adders 35 and 37 is the same as those shown in FIGS. 4h and 4m in view of the frequency domain. Also, in view of the three-dimensional domain, the composite filtering characteristic of the post-comb filter 39 is the same as that shown in FIG. 5e.

The first and second delay circuits 36 and 38 have the same delay characteristic.

Z-transforming a systemic function of the post-comb filter 39, the result is:

$$(1+Z^{-1})(1-Z^{-1}) \tag{1}$$

Then, frequency-transforming the above equation (1), the result is:

$$\begin{aligned}
H(e^{jwt}) &= (1 + e^{-jwt})(1 - e^{-jwt}) \\
&= e^{-jwT/2}(e^{jwT/2} + e^{-jwT/2}) \cdot e^{-jwT/2}(e^{jwT/2} - e^{-jwT/2}) \\
&= e^{-jwT/2}(e^{jwT/2} + e^{-jwT/2}) \cdot (e^{jwT/2} - e^{-jwT/2}) \\
&= e^{-jwT/2} \cdot 2\cos W T/2 \cdot 2j \sin w T/2 \\
&= 4je^{-jwT/2} \cdot 1/2 \sin WT \\
H(W) &= 2|\sin WT| \\
&= 2|\sin 2\pi fT|
\end{aligned}$$

where, $T = 525/fh$

A 7 level slicer 40 is connected to an output of the second adder 37 in the post-comb filter 39. The 7 level slicer 40 acts to slice the output of the second adder 37 because the post-comb filter 39 inputs 4 level data and outputs 7 level data. The output of the 7 level data slicer 40 is passed through a modulo-4 interpreter 41, which outputs 4 level data.

In FIG. 5a, the pre-coder 34 is provided to compensate for the characteristic of the post-comb filter 39. The pre-coder 34 and the post-comb filter 39 are complementary.

The pre-coder 34 comprises first and second feedback circuits. The first feedback circuit includes a first modulo-4 adder 30 and a first delay circuit 31. The first modulo-4 adder 30 has a first input connected to the output of the data formatter/error control circuit 2 shown in FIG. 1. The first delay circuit 31 has an input connected to an output of the first modulo-4 adder 30 and an output connected to a second input of the first modulo-4 adder 30.

The second feedback circuit includes a second modulo-4 adder 32 and a second delay circuit 33. The second modulo-4 adder 32 has a first input connected to the output of the first modulo-4 adder 30 in the first feedback circuit. The second delay circuit 33 has an input connected to an output of the second modulo-4 adder 32 and an output connected toga second input of the second modulo-4 adder 32.

The first and second delay circuits 31 and 33 have the same delay characteristic, The delay characteristic of the first and second delay circuits 36 and 38 in the post-comb filter 39 is the same as that of the first and second delay circuits 31 and 33 in the pre-coder 34. The delay characteristic of the first and second delay circuits 31 and 33 and 36 and 38 is 525 fh, which is one frame delay 525/fh.

Figure 6A:
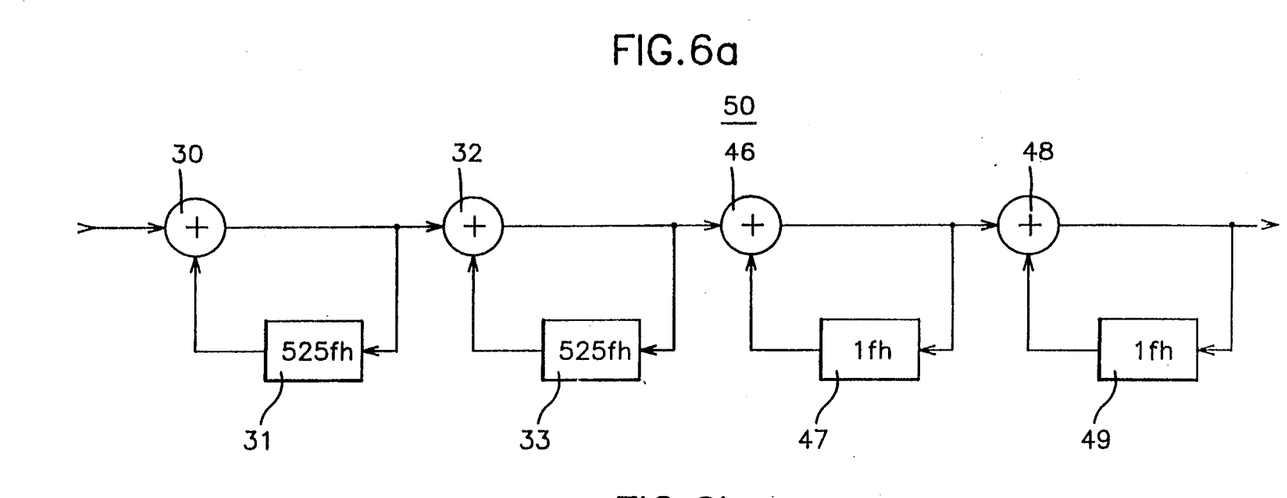
FIG. 6a is a block diagram of a pre-coder in accordance with an alternative embodiment of the present invention.
Figure 6B:
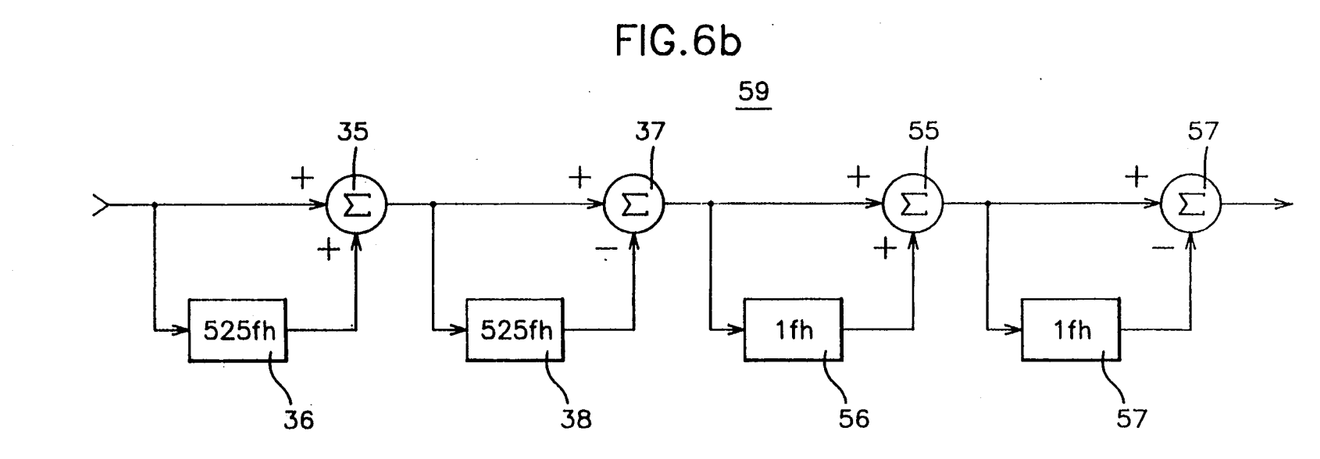
FIG. 6b is a block diagram of a post-comb filter in accordance with the alternative embodiment of the present invention.
Figure 6C:
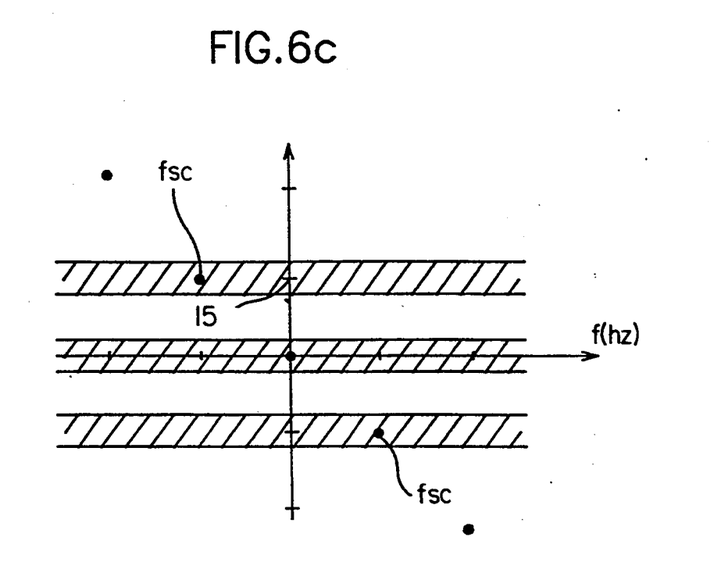
FIG. 6c is a view illustrating a third-dimensional filtering characteristic of third and fourth feedforward circuits in the post-comb filter in FIG. 6b.
Figure 6D:
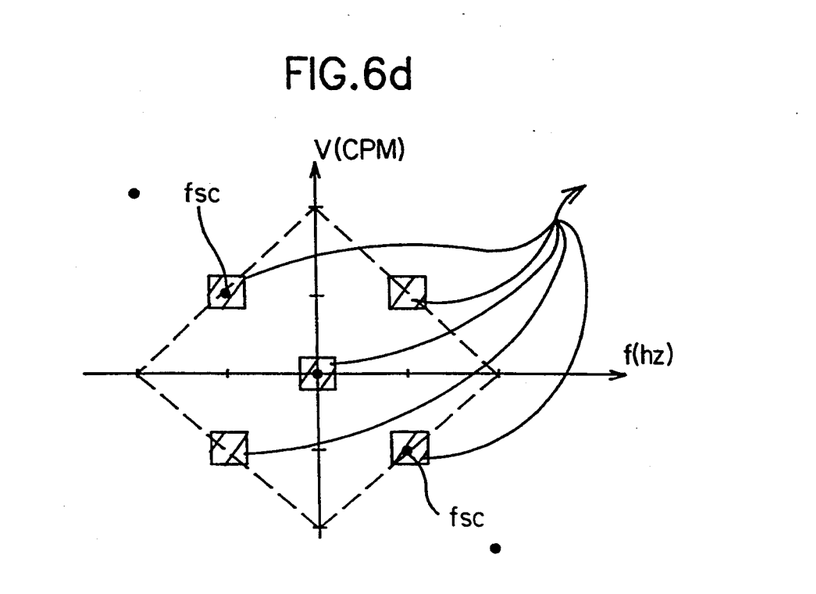
FIG. 6d is a view illustrating a composite third-dimensional filtering characteristic of the post-comb filter in FIG. 6b.

FIG. 6a is a block diagram of a pre-coder 50 in accordance with an alternative embodiment of the present invention, FIG. 6b is a block diagram of a post-comb filter 59 in accordance with the alternative embodiment of the present invention, FIG. 6c is a view illustrating a third-dimensional filtering characteristic of third and fourth feedforward circuits in the post-comb filter 59 in FIG. 6b and FIG. 6d is a view illustrating a composite third-dimensional filtering characteristic of the post-comb filter 59 in FIG. 6b.

Some of the components in FIG. 6a are the same as those in FIG. 5a. Therefore, like reference numerals designate like parts. As shown in FIG. 6a, the pre-coder 50 comprises third and fourth feedback circuits in addition to the construction in FIG. 5a. The third feedback circuit includes a third modulo-4 adder 46 and a third delay circuit 47. The third modulo-4 adder 46 has a first input connected to the output of the second modulo-4 adder 32 in the second feedback circuit. The third delay circuit 47 has an input connected to an output of the third modulo-4 adder 46 and an output connected to a second input of the third modulo-4 adder 46.

The fourth feedback circuit includes a fourth modulo-4 adder 48 and a fourth delay circuit 49. The fourth modulo-4 adder 48 has a first input connected to the output of the third modulo-4 adder 46 in the third feedback circuit. The fourth delay circuit 49 has an input connected to an output of the fourth modulo-4 adder 48 and an output connected to a second input of the fourth modulo-4 adder 48.

The third and fourth delay circuits 47 and 49 have the same delay characteristic.

Some of the components depicted in FIG. 6b are the same as those in FIG. 5b. Therefore, like reference numerals designate like parts. As shown in FIG. 6b, the post-comb filter 59 comprises third and fourth feedforward circuits in addition to the construction in FIG. 5b. The third feedforward circuit includes a third adder 55 and a third delay circuit 56. The third adder 55 has a first input connected to the output of the second adder 37 in the second feedforward circuit. The third delay circuit 56 has an input connected to the output of the second adder 37 in the second feedforward circuit and an output connected to a second input of the third adder 55.

The fourth feedforward circuit includes a fourth adder 57 and a fourth delay circuit 58. The fourth adder 57 has a first input connected to an output of the third adder 55 in the third feedforward circuit. The fourth delay circuit 58 has an input connected to the output of the third adder 55 in the third feedforward circuit and an output connected to a second input of the fourth adder 57.

The third and fourth delay circuits 56 and 58 have the same delay characteristic. The delay characteristic of the third and fourth delay circuits 56 and 58 in the post-comb filter 59 is the same as that of the third and fourth delay circuits 47 and 49 in the pre-coder 50. The delay characteristic of the third and fourth delay circuits 47 and 49 and 56 and 58 is 1 fh, which is one line delay 1/fh.

Figure 4N:
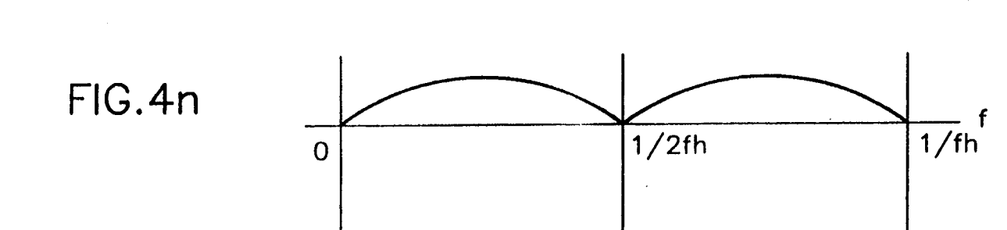

A filtering characteristic of the third and fourth adders 55 and 57 and the third and fourth delay circuits 56 and 58 is the same as that shown in FIG. 4N in view of the frequency domain. Also, in view of the three-dimensional domain, the filtering characteristic of the third and fourth adders 55 and 57 and the third and fourth delay circuits 56 and 58 is the same as that shown in FIG. 6c.

Figure 4O:
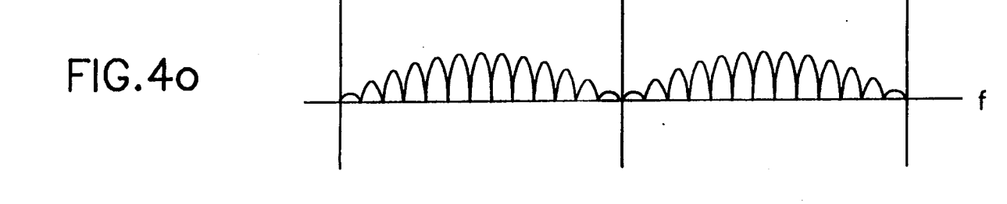

As a result, a composite filtering characteristic of the post-comb filter 59 with the first to fourth feedforward circuits is the same as that shown in FIG. 4O in view of the frequency domain. Also, in view of the three-dimensional domain, the composite filtering characteristic of the post-comb filter 59 is the same as that shown in FIG. 6d.

As apparent from the above description, according to the present invention, the video carrier, the chrominance subcarrier and the audio carrier and the harmonic components of the NTSC signal can completely be removed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cochannel interference filter for a HDTV transmission system having a transmitter and a receiver, comprising:

filtering means provided in said receiver for filtering a received HDTV transmission signal, said filtering means including null points at a frequency with the following response characteristic:

$$kfh/(2 \times 525)$$

where, k is an even number except 0 and fh is a NTSC horizontal line rate; and compensation means provided in said transmitter for compensating an HDTV transmission signal to be transmitted comprising transmission signal components removed by said filtering means.

2. A cochannel interference filter for a HDTV transmission system as set forth in claim 1, wherein said filtering means comprises:

a first feedforward circuit, said first feedforward circuit including first adding means and first delay means, said first adding means having a first input connected to an input to said filtering means, said first delay means having an input connected to the input to said filtering means and an output connected to a second input of said first adding means; and a second feedforward circuit, said second feedforward circuit including second adding means and second delay means, said second adding means having a first input connected to an output of said first adding means in said first feedforward circuit, said second delay means having an input connected to the output of said first adding means in said first feedforward circuit and an output connected to a second input of said second adding means.

3. A cochannel interference filter for a HDTV transmission system as set forth in claim 2, wherein said filtering means further comprises:

a third feedforward circuit, said third feedforward circuit including third adding means and third delay means, said third adding means having a first input connected to an output of said second adding means in said second feedforward circuit, said third delay means having an input connected to the output of said second adding means in said second feedforward circuit and an output connected to a second input of said third adding means; and a fourth feedforward circuit, said fourth feedforward circuit including fourth adding means and fourth delay means, said fourth adding means having a first input connected to an output of said third adding means in said third feedforward circuit, said fourth delay means having an input connected to the output of said third adding means in said third feedforward circuit and an output connected to a second input of said fourth adding means.

4. A cochannel interference filter for a HDTV transmission system as set forth in claim 3, wherein said third and fourth delay means have the same delay characteristic.

5. A cochannel interference filter for a HDTV transmission system as set forth in claim 4, wherein the delay characteristic of said third and fourth delay means is one line delay.

6. A cochannel interference filter for a HDTV transmission system as set forth in claim 2, wherein said first and second delay means have the same delay characteristic.

7. A cochannel interference filter for a HDTV transmission system as set forth in claim 6, wherein the delay characteristic of said first and second delay means is one frame delay.

8. A cochannel interference filter for a HDTV transmission system as set forth in claim 1, wherein said compensation means comprises:

a first feedback circuit, said first feedback circuit including first adding means and first delay means, said first adding means having a first input connected to an input to said compensation means, said first delay means having an input connected to an output of said first adding means and an output connected to a second input of said first adding means; and a second feedback circuit, said second feedback circuit including second adding means and second delay means, said second adding means having a first input connected to the output of said first adding means in said first feedback circuit, said second delay means having an input connected to an output of said second adding means and an output connected to a second input of said second adding means.

9. A cochannel interference filter for a HDTV transmission system as set forth in claim 8, wherein said compensation means further comprises:

a third feedback circuit, said third feedback circuit including third adding means and third delay means, said third adding means having a first input connected to the output of said second adding means in said second feedback circuit, said third delay means having an input connected to an output of said third adding means and an output connected to a second input of said third adding means; and a fourth feedback circuit, said fourth feedback circuit including fourth adding means and fourth delay means, said fourth adding means having a first input connected to the output of said third adding means in said third feedback circuit, said fourth delay means having an input connected to an output of said fourth adding means and an output connected to a second input of said fourth adding means.

10. A cochannel interference filter for a HDTV transmission system as set forth in claim 9, wherein said third and fourth adding means are modulo-4 adders.

11. A cochannel interference filter for a HDTV transmission system as set forth in claim 9, wherein said third and fourth delay means have the same delay characteristic.

12. A cochannel interference filter for a HDTV transmission system as set forth in claim 11, wherein the delay characteristic of said third and fourth delay means is one line delay.

13. A cochannel interference filter for a HDTV transmission system as set forth in claim 8, wherein said first and second adding means are modulo-4 adders.

14. A cochannel interference filter for a HDTV transmission system as set forth in claim 8, wherein said first and second delay means have the same delay characteristic.

15. A cochannel interference filter for a HDTV transmission system as set forth in claim 14, wherein the delay characteristic of said first and second delay means is one frame delay.

* * * * *